United States Patent [19]

Wrobel

[11] 4,130,770
[45] Dec. 19, 1978

[54] AXIAL FLOW FAN HAVING IMPROVED AXIAL LENGTH STRUCTURE

[75] Inventor: Güenter Wrobel, Villingen, Germany

[73] Assignee: Papst-Motoren KG, Germany

[21] Appl. No.: 471,604

[22] Filed: May 20, 1974

[30] Foreign Application Priority Data

Feb. 26, 1974 [DE] Fed. Rep. of Germany ... 7406629[U]

[51] Int. Cl.² .................................................. H02K 7/00
[52] U.S. Cl. ...................................... 310/67 R; 310/62
[58] Field of Search ....................... 310/67, 62, 63, 211, 310/91, 182, 183, 172

[56] References Cited

U.S. PATENT DOCUMENTS

| | | | |
|---|---|---|---|
| 2,990,112 | 6/1961 | Levy | 310/67 |
| 3,229,897 | 1/1966 | Papst | 310/67 |
| 3,596,121 | 7/1971 | Chang | 310/211 |
| 3,772,544 | 11/1973 | Wrobel | 310/67 |
| 3,777,191 | 12/1973 | Papst | 310/67 |
| 3,786,290 | 1/1974 | Papst | 310/67 |

*Primary Examiner*—R. Skudy
*Attorney, Agent, or Firm*—Craig & Antonelli

[57] ABSTRACT

An axially-flow fan motor structure of the type having an external rotor of a rotor stack and short-circuit rings, a stator structure and a rotor shaft with a fitting for connecting the external rotor for rotation about the stator structure, wherein the fitting is a flat metal sheet having anchoring elements about the peripheral edge extending at an angle $\alpha$ of less than 45° with respect to the plane of the sheeet. Thus, by this structure, improvements in the fan efficiency can be effected, particularly since the anchoring elements can be further spaced from the rotor pack. A further improvement can be provided in this structure by the use of a shaded-pole stator wherein the coil structure dimensions, radially and axially, of the stator are confined within defined boundaries.

28 Claims, 7 Drawing Figures

AXIAL FLOW FAN HAVING IMPROVED AXIAL LENGTH STRUCTURE

This invention relates to an axial-flow fan with a motor of the external-rotor type wherein the connection of the external rotor, fashioned as a short-circuit rotor, with the shaft comprises a fitting of sheet metal, preferably steel sheet, anchoring elements extending at an angle to the plane of the fitting and in the direction toward the rotor being provided along the outer periphery of this fitting, the anchoring elements being cast into one of the two short-circuiting rings of the rotor.

An axial-flow fan of this type is known from DOS (German Unexamined Lain-Open Application) No. 2,100,663 corresponding to U.S. Pat. No. 3,777,191. In a fan of this type of structure, several factors must be considered in mounting the rotor to the shaft:

(a) The mechanical attachment of the rotor to the shaft must be absolutely secure and permanent, so that the fan operates without trouble during its entire lifetime.

(b) For the ventilation of the motor, holes must ordinarily be provided in the sheet-metal fitting, which renders the latter weaker and thus requires the use of a relatively thick metal sheet.

(c) Within the rotor, a sufficiently large free space must be provided along its length for the laminated stator pack, the coil ends, and the insulation thereof.

(d) In those fans which, in Europe, are operated by a 50 c.p.s. mains and, in the United States, by a 60 c.p.s. mains, the slip must be kept to a minimum so that the speed (with the usual design as a double-pole motor) is maximally close to 3,000 r.p.m (Europe) or 3,000 r.p.m. (U.S.A.), for the fan output increases approximately with the third power of the speed. However, this requires the constructional engineer to extensively keep in mind the electric characteristics of the short-circuit rings; for example, the cast-in anchoring elements must not be disposed too closely to the laminated rotor pack, since otherwise the resistance of the respective short-circuit ring becomes too high and the speed too low.

In the conventional types of structures according to the above-mentioned patent, the last-cited factor could not be fully considered, in spite of its importance; in other words, certain concessions had to be made regarding the electric values of the short-circuit rings, and a loss in fan efficiency had to be tolerated, since otherwise the fitting could not have been securely mounted in the associated short-circuit ring to a sufficiently safe degree.

Furthermore, this invention contemplates an external-rotor type fan motor in a built-in axial-flow fan with a shaded-pole stator type motor disposed entirely within the circular-cylindrical cup-shaped space occupied by the fan wheel hub, the coil ends or coil winding heads of this motor being in intimate contact with the end faces of the stator plate pack, arranged vertically with respect to the fan axis, and being located completely within the peripheral contour of the stator plate pack.

For built-in axial-flow fans of the type mentioned above, only a limited axial installation depth is frequently available, which also restricts the axial length of the shaded-pole motor. For this reason, the coil ends are in close contact with the end faces of the stator plates, in a conventional fan of this type, which is accomplished by straps extended around the coil ends and pulling them against these end faces. In this arrangement, however, the coil ends have a circular and/or curved cross-sectional contour, except for small area portions where they are in contact with the end faces by interposed tension straps; thus, these coil ends cannot make optimum use of the space available within the peripheral contour of the stator plate pack with limited axial extension.

Consequently, it is an object of this invention to provide an efficient axial-flow fan with a short axial structural dimension and good motor characteristics, especially low slip.

According to the invention, this is accomplished in an axial-flow fan of the above-described external rotor motor type by providing a fitting wherein anchoring elements extend at an angle of less than about 45° to the plane of the fitting. By the relatively minor angle of less than about 45° and preferably about 20°–35°, it is made possible in a surprisingly simple manner to substantially enlarge the inclusion-free length of the short-circuit rings, based on the length of the laminated pack, *and* simultaneously to increase the axial structural length available for the stator. Various possibilities result from this arrangement: While retaining the existing fan efficiency, the axial length of the fan can be reduced, i.e. a flatter axial-flow fan can be built; also, with the same axial structural length, the slip of the motor can be reduced, i.e. the fan efficiency can be increased; furthermore, with the same axial dimension and the same motor output, a simpler stator construction can be utilized, i.e., for example the above-mentioned shaded-pole stator can be employed instead of a three-phase stator with an auxiliary capacitor phase; besides, it is also possible to use a motor with a larger air gap diameter, i.e. a greater torque, for a smaller axial length of the fan, i.e. the ratio of air gap diameter to fan length can be substantially increased, as demonstrated, for example, in the following by an example, by no less than 32% with an increase in output of no less than 125%.

Especially in small induction motors with power consumption on the order of 10–50 watts, the values attainable by the present invention are thus quite astonishingly higher.

A further object of this invention is to reduce the required axial structural dimension of a fan of the type mentioned hereinabove by the use of a shaded pole stator. This object is attained by this invention by reducting the axial space requirement of the coil ends and by the feature that the coil end sections facing away radially and axially from the center of the stator plate pack extend in the center of their periphery over at least one-third of the radial dimension of the coil end and over at least one-third of the peripheral length of the coil end, up to a respective planar boundary area disposed on opposite stator pack sides and being vertical to the fan wheel axis; and that all windings are arranged entirely within an interspace between the two boundary surfaces.

With a given axial over-all height of the stator pack, a certain minimum cross section of the coil ends is necessary to obtain a maximum degree of efficiency of the motor, and the invention makes it possible to accommodate this consequently required coil end cross section with a minimally small additional axial space requirement and without any additional radial space requirement.

In addition to an improved space exploitation of a space available for the windings, this feature of the invention furthermore achieves an improved heat removal of the heat due to energy losses produced in the coil ends, because the heat can be more readily conducted away, due to an improved direct contact and a smaller distance from surrounding, heat-conductive elements of the hub. This has a particularly favorable effect if the casing of the hub of the fan wheel is formed by the rotor of a shaded-pole motor, the metallic fan blades being welded to the sheet-metal laminae of this rotor. The heat due to energy losses radiated radially outwardly via the still remaining, small air gap then passes into the rotor which can be cooled satisfactorily by the welded-on fan blades.

Another object resides in providing a process for winding a stator plate pack of a built-in axial-flow fan of the aforementioned type so that this winding step can be accomplished with the use of the conventional winding devices without any special conditions with an optimum utilization of the winding space.

In this process, the circumstance that the axial extension of the coil ends up to the boundary surfaces can be maintained exactly within extraordinarily minor tolerance values is of particular advantage; this holds true also under mass production conditions. This fact makes it possible to accommodate the stator under low tolerances in the axial direction in the fan hub, thus attaining a compact arrangement promoting the heat removal.

Further details and advantageous additional developments of this invention can be seen from the embodiments described herein and illustrated in the drawings, to wit:

FIGS. 3 and 4 are likewise illustrated on a 1:1 scale, in order to clarify the small dimensions in the motors of such axial-flow fans, necessitating an optimum space utilization;

Figure 1:
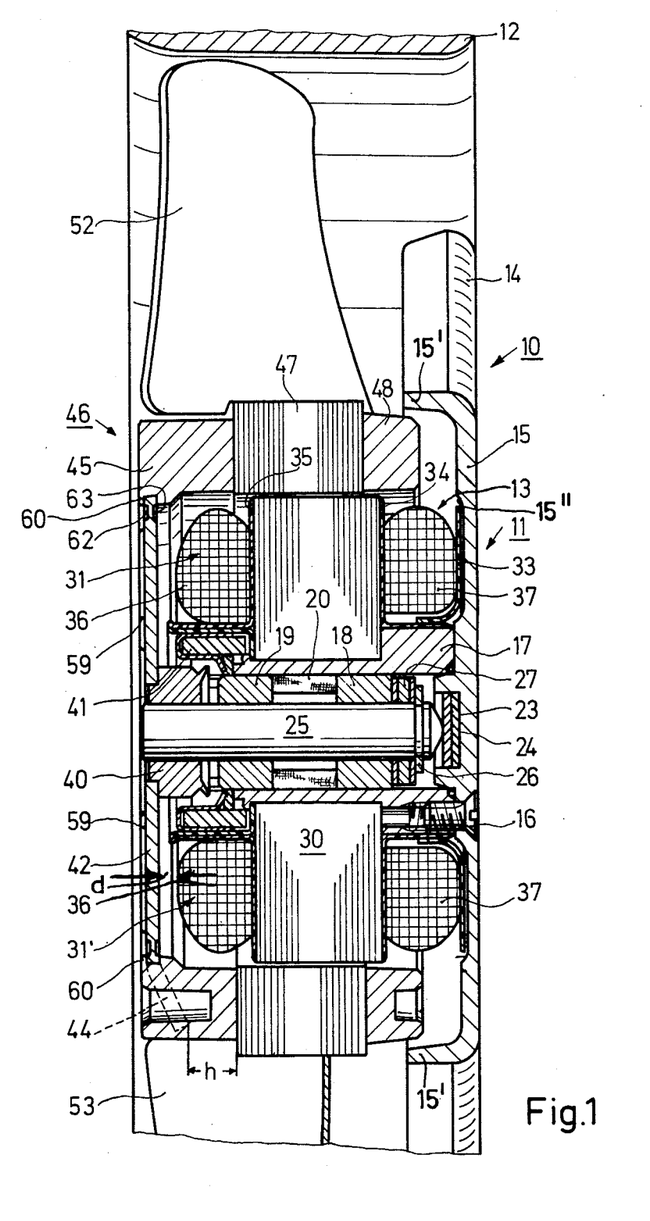
FIG. 1 is a longitudinal sectional view of an example for an axial-flow fan of this invention, the scale being approximately 2:1.

FIG. 1 shows a longitudinal section through part of an axial-flow fan 10, driven by an external-rotor-type motor 11. The fan 10 has an outer casing consisting essentially of a cast fitting 12, the outer rim of which is not shown in FIG. 1 and is ordinarily provided with a flange for attachment to a housing such as may be seen in FIG. 5, for example. A mounting plate 15 is attached to one end face of this outer casing 12 via four radial arms or spokes 14.

A bearing support pipe or sleeve 17 is attached to the mounting plate 15 by means of screws 16, of which only one is shown; the stator 13 of the motor 11 is mounted on this sleeve in the manner illustrated. Two journaled, sliding bearings 18, 19 of a sintered material are provided in the interior of the bearing support sleeve 17, a felt piece 20 being disposed between these two bearings; this felt piece serves as a lubricant reservoir. Furthermore, two disks 24 are mounted in an indentation 23 of the mounting plate 15, serving as the first axial bearing for a shaft 25. The latter has a recess for a spring ring 26 at its left-hand end (as shown in FIG. 1), this spring ring holding three disks 27 forming, with the right-hand end face of the journal bearing 18, a second axial bearing for the shaft 25. Thus, the shaft 25 is retained, by means of the two axial bearings 24 and 18, 27, in a specific axial position, while the two journal bearings 18 and 19 guide the shaft 25 radially.

A laminated stator pack 30 is attached to the bearing carrier pipe 17; windings 31 and 31' are inserted in this pack in a convenient manner such as is described hereinafter. These windings have coil ends, the left-hand ones being denoted by 36 and the right-hand ones by 37. The stator may be constructed as a shaded-pole construction, as described later, but within the scope of this invention it is, of course, also possible to utilize other types of stator structures. In order to insulate the windings 31 and 31' against the laminated stator pack 30 and the mounting plate 15, insulating elements 33, 34, and 35 are provided.

A bushing 40, simultaneously serving as an oil thrower ring for an oil-suction system 41, is pressed onto the shaft 25. A fitting 42, formed from steel sheet, is, in turn, attached to this bushing 40 for rotation therewith. As illustrated in FIG. 4, this fitting has a total of eight openings 43 for the passage of air. Anchoring elements 44 are provided on the outer rim of the fitting, these elements being cast into one of the short-circuiting rings 45 of an external rotor 46 provided with a squirrel cage; the external rotor also has a laminated sheet-metal pack 47 and a second short-circuiting ring 48. Between the two short-circuiting rings 45 and 48, rods are provided which are cast into grooves of the sheet-metal pack 47, one of these rods being indicated at 49 in FIG. 3. These rods likewise pertain to the squirrel cage; this cage can consist, for example, of pure aluminum.

Several fan vanes are directly welded to the sheet-metal pack 47 of the rotor 46, two of these being illustrated at 52 and 53.

The contour of the fitting 42 can be seen from the lower half of FIG. 4. Eight cutouts 57 are punched along its outer rim, only four of these being visible in FIG. 4. These cutouts 57 have such a shape that the anchoring elements 44 have widened portions 58 in the peripheral direction on their free ends, effecting a firm anchoring in the short-circuiting ring 45.

Figure 2:
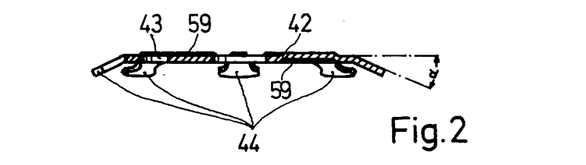
FIG. 2 shows a longitudinal section through the sheet-metal fitting employed in the motor of FIG. 1, the scale being 1:1.
Figure 3:
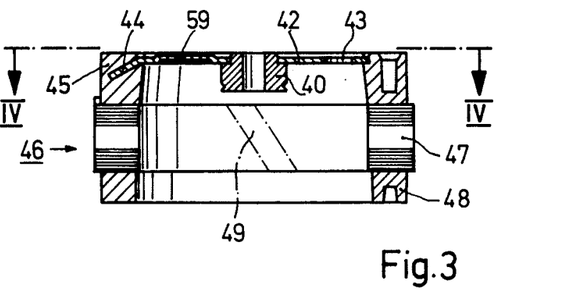
FIG. 3 shows a longitudinal sectional view of a rotor of the type employed in the motor of FIG. 1, as seen along the line III—III of FIG. 4.
Figure 4:
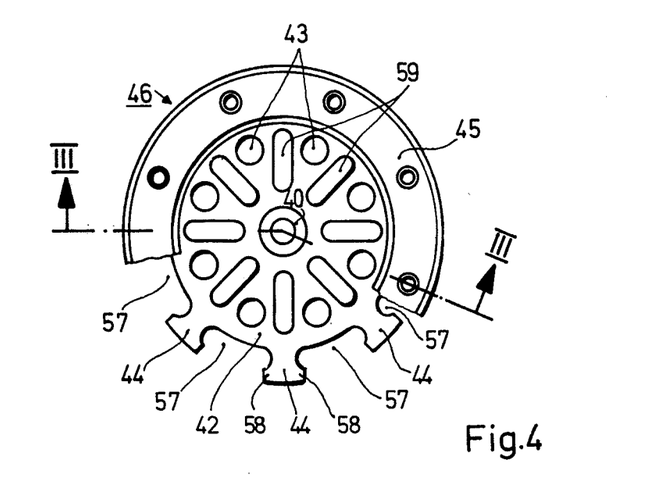
FIG. 4 shows a top view of the partially sectionally shown rotor of FIG. 3, as seen along the line IV—IV of FIG. 3.

As can be seen especially clearly in FIGS. 2-4, eight reinforcing depressions 59 are embossed in the fitting 42, extending in the radial direction, which serve to reinforce the fitting. This measure has proven to be very advantageous especially if (as can be seen especially clearly from FIG. 3) the rotor has a large ratio of outer diameter to axial length and if, as further illustrated, the fitting must be arranged maximally far toward the outside, so that the coil ends 36 and 37 have sufficient room. For, in any event, a sufficient material cross section of the cast aluminum must be present at the points denoted by 60 in FIG. 1, for example with a height of 0.7 mm., so that the fitting 42 must in any case be offset in the direction toward the stator 13 by this dimension, and an appropriate space exists for the reinforcing indentations 59. By the selection of a thin metal sheet, e.g.

with a thickness of 1.5 mm. at an air gap diameter of 50 mm., a sufficiently rigid construction is still attained which, during operation, can readily transmit the forces exerted by the vanes 52, 53 to the shaft 25.

It is of special importance that the anchoring elements 44 are bent under a relatively flat angle α (FIG. 2) with respect to the plane of the fitting 42. In the example, this angle is only about 25°. The anchoring elements 44 proper extend almost up to the outer rim of the short-circuiting ring and, as illustrated, have an outer diameter amounting to approximately 90–98% of the outer diameter of the short-circuiting ring 45 with an outer diameter of approximately 97% of the outer diameter of short-circuit ring 45 being advantageous. In this way, a very satisfactory anchoring action is obtained, namely without the anchoring elements essentially increasing the resistance of the short-circuiting ring 45.

By comparing this structure of the present application with conventional devices, such as that of previously mentioned U.S. Pat. No. 3,777,191, it is found that, in the present fan, the air gap diameter is 20% larger, while the axial structure length (38 mm.) and the length of the laminated rotor pack 47 can be maintained the same. The spacing between the anchoring elements 44 and the laminated pack 47, denoted by h in FIG. 1, is, in an arrangement according to this invention, about 80% larger, and also the length of the short-circuiting ring 48 is about 20% larger. Furthermore, the coil ends 36, as well as the coil ends 37 can project further to an extent of about 20%, i.e. a larger amount of copper can be incorporated into the windings. As compared to the constructed motor of U.S. Pat. No. 3,777,191, the motor of FIG. 1 of the present application—with the same axial structural length of 38 mm. — thus has an output power which is larger by 125%.

Naturally, the embossed reinforcing indentations 59 can have varying configurations, depending on the requirements. If space relationships make this possible, a thicker metal sheet without these reinforcements can also be employed, wherein the embossed areas 62 and 63 (FIG. 1) caused by the casing tool also afford a certain reinforcement.

The angle α can be varied in dependence on the requirements; however this angle should not exceed 45° and should advantageously range between about 20° and 35°.

As shown in FIG. 4, an optimum rigidification is obtained by the reinforcing identations 59 if the latter extend almost from the hub or bushing 40 up to the short-circuiting ring 45 and approximately in the radial direction.

The ratio of the thickness of the fitting 42 consisting of steel sheet to the air gap diameter can suitably range on the order of 2–3%, with the use of radial reinforcing indentations 59. In case of an air gap diameter of 50 mm., this results, for example, in a sheet-metal thickness of about 1.5 mm.

In a further development of this invention, the rim 15' of the mounting plate 15 is extended radially toward the outside so that the edge (short-circuiting ring) 48 of the rotor jacket 46 axially enters this rim. Also, it is furthermore advantageous to place the insulating ring 33 of the coil end 37 maximally closely to the mounting plate 15, preferably in the indentation 15" thereof. Of course, the planar annular surface of the insulating element 33 can flushly contact element 15, since the mass production technique requires an axial tolerance play. The insulating parts 34, 35 can be realized in a compact structure as so-called fluidized-bed coating layers. The coil end 36, which is not additionally insulated and thus more efficiently cooled, has the electrically required safety distance d(e.g. 2 mm.) from the steel disk 42; this coil end must have a certain spacing from the rotor (42/46), anyway, so that here again the axial dimension is at a minimum; a contributory factor toward this end is the depth of the reinforcing indentations 59 (which terminate about flush with the end face of the short-circuiting ring 45), extending away from the coil end 36.

These steps of the present invention make is possible to shorten the axial fan length of 50 mm. U.S. Pat. No 3,777,191, to 38 mm., i.e. by about one-fourth, with the same active (iron) magnetic length of the motor.

Figure 5:
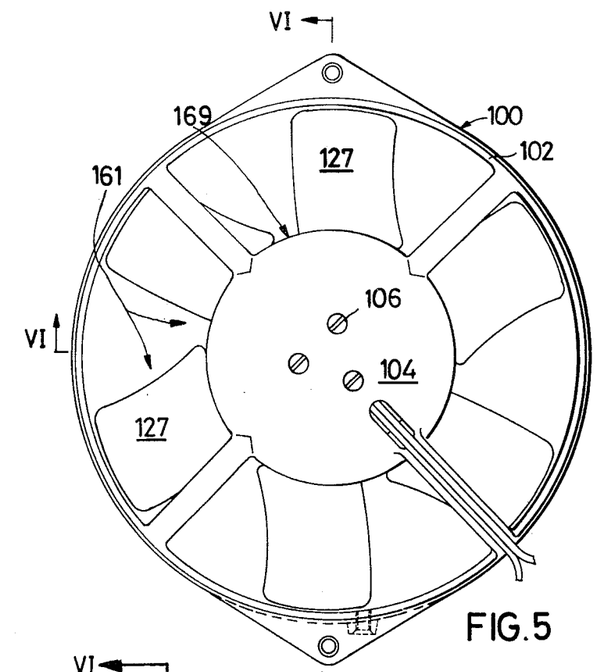
FIG. 5 shows a built-in axial fan according to a further embodiment of the invention, utilizing a shaded-pole stator, as seen from the inlet end.
Figure 6:
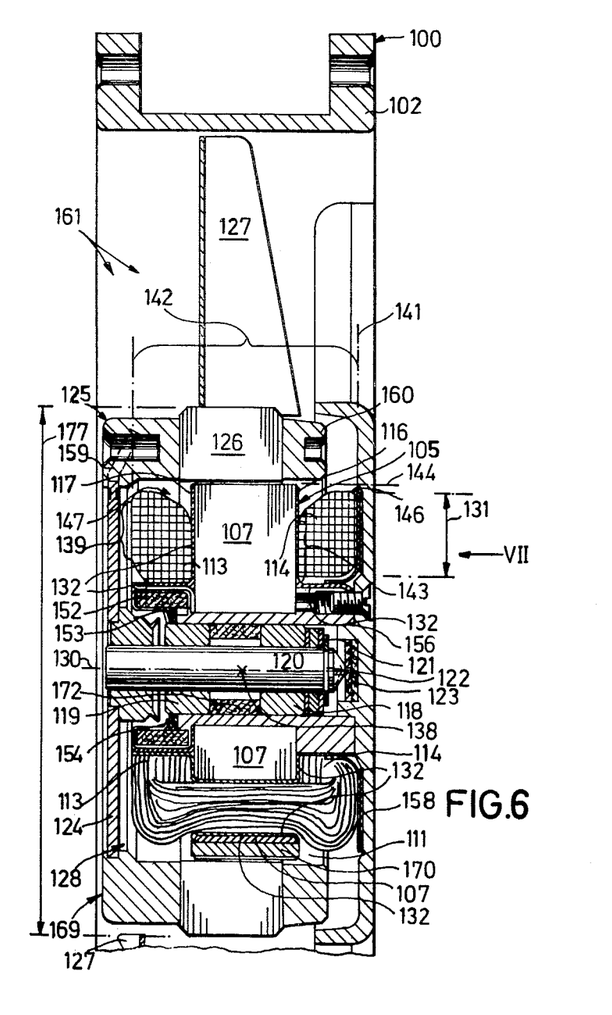
FIG. 6 shows the sectional view along line VI—VI as broken away from the illustration of the embodiment of FIG. 5.

A further embodiment of the present invention is described in FIGS. 5–6, wherein 100 denotes a fan casing consisting of an outer ring 102 and a flange 104 attached thereto by means of four spokes 103. The stator, denoted generally with 105, is threadedly attached to the flange 104 by means of screws 106. The stator 105 consists of a laminated stator pack 107 with two windings 108 and 109, connected electrically in series. Due to the angled position of the sectional view, only the winding 109 is visible in FIG. 6. The two windings 108 and 109 are wound through opposing slotted wells 110 and 111 and extend with respectively two coil ends on both sides of the stator pack 107. The coil ends of the winding 109 are both visible in FIG. 6 and are denoted by 113 and 114. The coil end 114 can also be seen in FIG. 7, along with the coil end 115 of the winding 108, disposed on the same end face 116 of the stator pack 107. The coil end of the winding 108 located on the opposite end face 117 cannot be properly seen in any of these figures.

The stator pack 107 is attached to a bearing sleeve 156 in which are inserted two bearing bushings 118 and 119 of sintered metal. The rotor shaft 120 is rotatably supported therein. An oiled felt 152 is inserted in the bearing sleeve 156, which latter is covered with respect to the coil ends by an insulating varnish layer 132. This felt 152 leads, via felt-filled cross ducts 153, 154 to the bearing bushing 119, these ducts being arranged over the periphery. In this way, the bearing bushing 119 can be supplied with oil from one of the felts 152. A felt ring 172 between both bearing bushings 118 and 119 serves to supply the bearing bushing 118 with oil. One end of the rotor shaft is secured against axial displacement in the bearing bushings 118 and 119 by means of a retainer ring 121 engaging annular groove 122 and rests, via two buffer disks 123, on the flange 104. On the other end of the shaft 120, a steel plate 124 as described above, is attached, to which is mounted the annular external rotor 125 of the shaded-pole motor of the present embodiment. The steel plate 124 is thin, so that, though affording sufficient rigidity, it requires only a minimum amount of space in the axial direction. The rotor 125 consists of an annular laminated pack 126; the sheet-metal laminae being joined by welding to the sheet-metal fan blades 127 of the fan wheel 161 with seven of these blades, for example, being provided. Furthermore, the rotor comprises short-circuit rings 159, 160 of aluminum arranged at the end faces thereof. The flange 104 defines, together with the external rotor 125 and the steel plate 124, a circular-cylindrical cup-shaped space 128 of the fan hub, which latter is generally denoted by 169. This cup-shaped space 128 is occupied by the double-pole external-rotor shaded-pole motor of the present invention, consisting of the stator 105 and the external rotor 125. The shorter the space requirement for the shaded-pole motor in the axial direction — i.e. in the direction of the fan axis 130 — the smaller can be the axial structural dimension of the fan hub 169 and thus of the entire built-in fan.

In order to keep this axial space requirement, with a predetermined hub diameter according to the double arrow 177, at a minimum, the coil ends are pressed, during their manufacture, against the stator pack 107 by means of a flat piston, which is later removed, as will be described in detail further below. This is done so that the coil end sections facing away from the center 138 of the stator pack radially and axially — for example the coil end section 139 — extend up to respective wide surface areas to planar boundary surfaces 140, 141 disposed annularly about the fan wheel axis 30 to define an interspace 142 therebetween, and so that the coil end sections facing the stator pack center 138 radially and axially — for example the coil end section 143 — are in flat contact with the respective facing end surfaces 116, 117. Both windings 108 and 109 are disposed entirely in the interspace 142 between these boundary surfaces 140 and 141, so that this interspace determines the axial space requirement for the windings.

Figure 7:
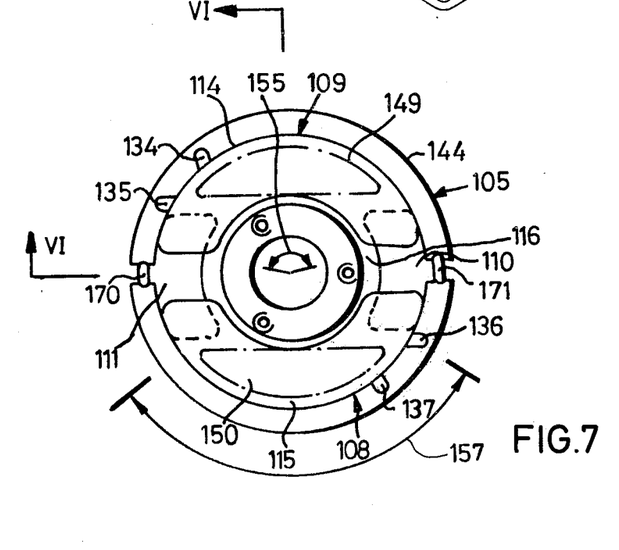
FIG. 7 shows the stator of the embodiment shown in FIGS. 5 and 6, seen by itself, in the direction of arrow VII in FIG. 6.

In FIG. 7, the dot-dash line 149 is a contour of the area over which the flatened coil end 114 extends up to the boundary surface 141. The area defined by the dot-dash line 149 extends in the peripheral center, approximately over nine-tenths of the radial coil end area indicated by the double arrow 131 in FIG. 6 and over more than two-thirds of the peripheral coil end length indicated by the double arrow 155. In FIG. 7, the dot-dash line 150 defines the surface area of the end face 116 in FIG. 6 by way of which the coil end 115, with the interposition of the short-circuiting bridges 136, 137 and the varnish insulating layer 132 in FIG. 6, has direct surface contact with an end face 116. This area, bounded by the dot-dash line 150, extends almost up to the slotted wells 110 and 111, which latter, insofar as they are covered by the coil ends illustrated in FIG. 7, are shown in dashed lines. The surface area defined by the line 150 extends over the peripheral length indicated by the double arrow 157.

The winding space available for the coil ends is limited radially outwardly by the circular peripheral contour 144 of the stator pack. By the flat-pressed configuration of the coil ends, as provided by this invention, the radially outwardly disposed zone of the winding spaces 146 and 147 in FIG. 6 is utilized more favorably, whereby axial space is saved.

The insulating varnish layer 132 covers all surfaces of the stator pack 107 oppositely to the windings 108, 109, as well as the projecting sections of the short-circuiting bridges 134-137. Thus, this layer also lines the slotted wells 110, 111 of the stator pack 107.

The wires from which the windings 108 and 109 are coiled are coated with two layers of insulating varnish. The outwardly arranged insulating varnish layers of the wires are joined by melting, gluing, or welding, in order to fix the coil ends in the flatly depressed condition illustrated in the drawings. Numerals 170 and 171 denote two iron webs inserted in the stator pack after the windings 108 and 109 have been produced.

The preferred method for winding the stator pack 107 with the two windings 108 and 109 is as follows:

Copper wire is insulated by dipping into an insulating varnish of polyester amide, thus coating the wire with a varnish layer. This insulating varnish layer cures at room temperature and remains hard up to temperatures of 160° C. A second insulating varnish layer of modified polyamide is dip-coated over the first layer. The modified polyamide remains hard up to a maximum operating temperature of 120° C., but softens at a baking temperature of 160° C. and becomes tacky.

The stator pack 107 is insulated on both end faces 116 and 117 with the insulating varnish layer 132 extending also over the free sides of the bearing sleeve 156 facing the coil ends and also fully lining the slotted wells 110 and 111. These insulating varnish layers applied to the stator pack 107 consists of single-component epoxy resin. The epoxy resin is applied in the cold state to the stator pack, which latter has been heated to 120° C., and is cured to a firmly adhering, continuous, electrically insulating varnish layer. The thus-obtained layer of insulating varnish remains hard at temperatures of at least up to 160° C.

By means of the twice-varnish-insulated wire, the two windings 108 and 109 are now wound onto the stator pack provided with the varnish insulating layer 132. The webs 170 and 171 are removed so that the slotted wells 110 and 111 are open toward the outside. The windings 108 and 109 are constructed so that their coil ends extend axially outwardly to a considerable extent beyond the boundary surfaces 140 and 141. In the coil ends, the wires are not taut, but loose.

The thus-wound stator pack is heated to 160° C. —this being the so-called baking temperature at which the polyamide of the outer insulating varnish layer of the wires becomes tacky. While the external insulating varnish layer is tacky due to the use of the baking temperature, the coil ends of the windings 108 and 109 are pressed against the end faces 116 and 117 by means of two press rams, until the coil ends assume the configuration shown in the drawing, and the end faces of the press rams extend along the boundary surfaces 140 and 141. In this condition, the outer insulating varnish layer of the wires, consisting of modified polyamide, is cured. The outer insulating varnish layers of adjacent wires have now been glued together and form a stable structure holding the downwardly pressed coil ends in the flat-pressed condition. The inner layer of insulating varnish forms a sufficient electrical insulation for the wires. The maximum operating temperature is 120° C., and at this temperature the modified polyamide likewise remains hard. During the depression of the coil ends, several wire loops are pressed toward the side and traverse a longer path. The wire loops in the coil ends are would so loosely that this longer extension cannot cause any undue stresses damaging to the wire.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In an axial-flow fan motor structure of the type comprising an external rotor including a rotor stack and at least two short-circuit rings, said rotor being mounted for rotation about an axis, a stator structure mounted about said axis, and a rotor shaft and fitting mounted on said axis, said fitting being a sheet having anchoring elements extending about a peripheral edge of said fitting for connecting said rotor to said rotor shaft by connection of said anchoring elements to one of said two short-circuit rings, the improvement comprising said anchoring elements being disposed at an angle α of less than 45° with respect to the plane of said sheet such that the resistance of said one short-circuit ring is reduced.

wherein said anchoring elements extend at an angle α of about 20° to 35° to the plane of said sheet, wherein said fitting is a thin steel sheet having reinforcing embossed indentations thereon, and wherein said steel sheet has a thickness corresponding to a ratio of thickness to motor air gap diameter in the range of about 2 to 3%.

2. A structure according to claim 1, wherein said reinforcing indentations extend approximately radially.

3. A structure according to claim 2, wherein at least a portion of said reinforcing indentations extend more than one-half the distance between a connection of said fitting with said shaft and the inner rim of the respective short-circuit ring secured to said anchoring elements.

4. A structure according to claim 3, wherein said anchoring elements are secured in said short-circuit ring to a distance corresponding to about 90 to 98% of the outer diameter of said short-circuit ring.

5. Structure according to 4, wherein said anchoring elements are fan-shaped at their free ends.

6. A structure according to claim 5, wherein said stator structure is a shaded-pole stator.

7. An axial-flow fan structure for controlling the axial length thereof comprising an external rotor including a rotor stack and two short-circuit rings sandwiched about said rotor stack, said rotor being mounted for rotation about an axis, a stator structure mounted about said axis, and a rotor shaft and fitting mounted on said axis, said fitting comprising a thin steel sheet having reinforcing embossed indentations thereon with said sheet having anchoring elements about a peripheral edge of sad fitting and said anchoring elements extending at an angle α of less than 45° with respect to the plane of said sheet, said anchoring elements being secured to one of said two short-circuit rings, wherein said reinforcing indentations project from a surface of said fitting facing away from said stator structure, and wherein said steel sheet has a thickness corresponding to a ratio of thickness corresponding to a ratio of thickness to motor air gap diameter in the range of about 2 to 3%.

8. A structure according to claim 7, wherein said reinforcing indentations extend approximately radially.

9. A structure according to claim 8, wherein at least a portion of said reinforcing indentations extend more than one-half the distance between a connection of said fitting with said shaft and the inner rim of the respective short-circuit ring secured to said anchoring elements.

10. A structure according to claim 9, wherein said anchoring elements are secured in said short-circuit ring to a distance corresponding to about 90 to 98% of the outer diameter of said short-circuit ring.

11. Structure according to claim 10, wherein said anchoring elements are fan-shaped at their free ends.

12. A structure according to claim 11, wherein said stator structure is a shaded-pole stator.

13. A structure according to claim 7, wherein said anchoring elements extends at an angle α of about 20° to 35° to the plane of said sheet.

14. A structure according to claim 7, wherein said stator structure includes a laminated stator plate pack and coil end sections in intimate contact with end faces of said stator plate pack, said coil end sections being located completely within the peripheral contour of said stator plate pack.

15. A structure according to claim 14, wherein each coil end section extends their peripheral center over at least one-third of the radial extension of said coil end section and over at least one-third of the peripheral length of said coil end section up to planar boundary surfaces defining an interspace within which all coil windings of said stator structure are completely arranged.

16. A structure according to claim 15, wherein said coil end sections are in flat contact with respective end faces of said stator plate pack over at least one-half the radial thickness of said coil end section along their entire peripheral length, the surfaces of said stator structure being in contact with said coil end sections having a varnish layer thereon.

17. A structure according to claim 7, wherein fan blades are connected to said rotor stack.

18. In an axial-flow fan motor structure of the type comprising an external rotor including a rotor stack and at least two short-circuit rings, said rotor being mounted for rotation about an axis, a stator structure mounted about said axis, and a rotor shaft and fitting mounted on said axis, said fitting being a sheet having anchoring elements extending about a peripheral edge of said fitting for connecting said rotor to said rotor shaft by connection of said anchoring elements to one of said two short-circuit rings, the improvement comprising said anchoring elements being disposed at an angle α of less than 45° with respect to the plane of said sheet such that the resistance of said one short-circuit ring is reduced, and further comprising a mounting plate having an annular rim projecting toward the motor structure, said annular rim projecting around the other of said short-circuit rings of said external rotor.

19. A structure according to claim 18, wherein said anchoring elements extend at an angle α of about 20° to 35° to the plane of said sheet.

20. A structure according to claim 19, wherein said fitting is a thin steel sheet having reinforcing embossed indentations thereon.

21. A structure according to claim 18, wherein said mounting plate includes on its surface facing said stator structure an indentation accommodating coil ends of said stator structure, said surface being provided with an insulating sheet element.

22. A structure according to claim 18, wherein said stator structure includes a laminated stator plate pack and coil end sections in intimate contact with end faces of said stator plate pack, said coil end sections being located completely within the peripheral contour of said stator plate pack.

23. A structure according to claim 22, wherein each coil end section extends in their peripheral center over at least one-third of the radial extension of said coil end section and over at least one-third of the peripheral length of said coil end section up to planar boundary surfaces defining an interspace within which all coil windings of said stator structure are completely arranged.

24. A structure according to claim 23, wherein said coil end sections are in flat contact with respective end faces of said stator plate pack over at least one-half the radial thickness of said coil end section along their entire peripheral length, the surfaces of said stator structure being in contact with said coil end sections having a varnish layer thereon.

25. A structure according to claim 22, wherein fan blades are connected to said rotor stack.

26. A structure according to claim 18, wherein fan blades are connected to said rotor stack.

27. A structure according to claim 18, wherein said anchoring elements are secured in said short-circuit ring to a distance corresponding to about 90 to 98% of the outer diameter of said short-circuit ring.

28. A structure according to claim 18, wherein said stator structure is a shaded-pole stator.

* * * * *